April 17, 1962 — S. CHUDY — 3,030,104
COMPENSATING LOCATORS
Filed Nov. 15, 1960
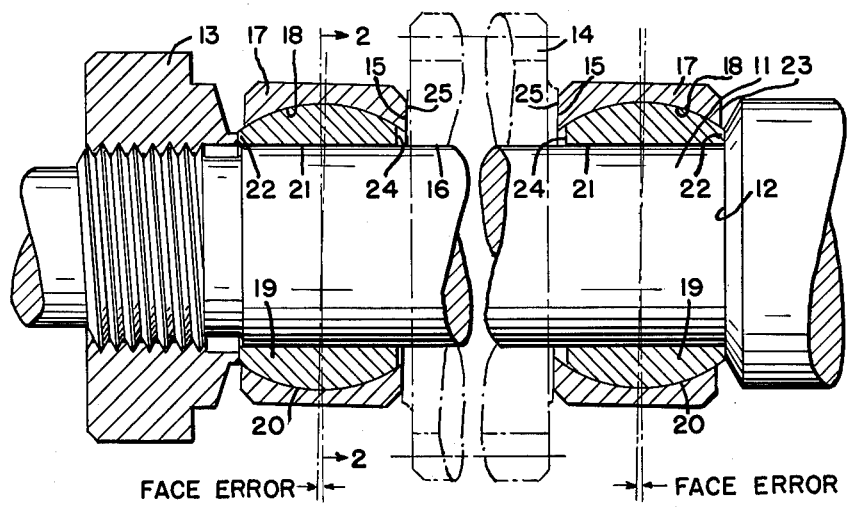
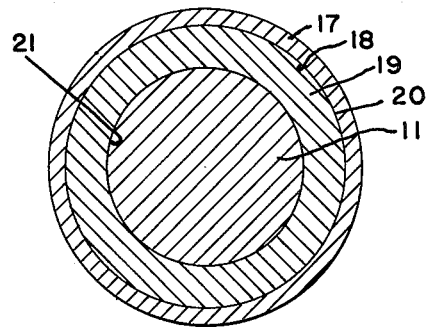
INVENTOR.
STANLEY CHUDY.
BY
ATTORNEY.

3,030,104
COMPENSATING LOCATORS
Stanley Chudy, 4110 Schenck Ave., Deer Park, Ohio
Filed Nov. 15, 1960, Ser. No. 69,472
1 Claim. (Cl. 269—52)

In the manufacture of precision gears, it is essential the finished gear has its teeth concentric with the bore of the gear for quiet operation and long life. At present the gear blank is held on an arbor after being bored, by clamping against the faces of the gear. The cutting of the gear teeth and all successive operations are performed with the blank held in this position. However, if the faces of the gear blank are not machined on an absolute true perpendicular to the bore, the blank is often distorted, particularly on small diameter bores due to the clamping force on the faces with a consequent distortion of the arbor and resultant error in the cut teeth in respect to the bore. My improvement positions the gear blank in absolute trueness with the bore regardless of any error in the faces, whereby the teeth will be cut in true concentricity with the bore.

It will be understood that this device is not limited to gears, but can be used on any work piece having a bore and on which a true concentric peripheral face in respect to the bore is desired to be machined.

The object of my invention is to provide floating clamp members on an arbor to hold a work piece in true concentricity with the bore while machining the peripheral face.

A further object is to provide a pair of members for clamping the work piece on an arbor consisting of compensating inner members on the arbor and outer members radially engaged with the inner members to adjust to face errors in the work piece.

My invention will be further readily understood from the following description and claim, and from the drawings, in which latter:

FIG. 1 is a horizontal cross-section of my invention mounted on an arbor.

FIG. 2 is a vertical cross-section of the same, taken in the plane of the line 2—2 of FIG. 1.

My improvement is designed for use with an arbor 11 which may be a plain arbor as shown in the drawings or an expanding arbor which is well known in the art. The arbor 11 has a shoulder 12 and a clamping nut 13.

In the machining of gears, the gear blank 14 is bored and the faces 15 are semi-finished, however, the faces often are not true in respect to the bore 16. In the drawings this face error is exaggerated for the purpose of illustration. Any face error can be corrected after hardening of the finished gear in the final grinding operation. But if such face error exists, in all previous methods, gear blanks which were rigidly clamped between the shoulder 12 and the nut 13, the blank was distorted in relation to the bore and caused the finished gear to have teeth out of true concentricity with the bore. However, with my improvement compensating locators are used comprising an outer member 17 having an inner spherical face 18 and an inner member 19 with a spherical face 20 mating with the spherical face 18 of the member 17. The inner member 19 has a bore 21 fitting the arbor 11. One end 22 of the member 19 extends beyond the face 23 of the member 17 and the other end 24 is inside the face 25 of the member 17.

In the operation of the device, one of the compensators is placed on the arbor with the face 22 abutting the shoulder 12. The work piece is slipped on the arbor and the other compensator clamped to the work piece by means of the arbor nut 13. The outer members 17 will adjust to the faces 15 on the work piece without imparting any strain on the arbor, thus maintaining the machining of the peripheral face of the work piece in true parallelism with the bore. Radial forces are asserted between the inner members 19 and the outer members 17 in the clamping action.

Having thus fully described my invention, what I claim as new and desire to secure by Letters Patent, is:

In a work piece compensating locator, an arbor, a work piece having a bore fitting said arbor, a compensator on each side of said work piece, means for clamping said work piece between said compensators, said compensators having outer members and inner members with mating spherical faces between said members and said inner members having end faces extending beyond the faces of said outer members, said outer members having faces extending beyond the other faces of said inner members whereby said inner members will assert a radial clamping force on the outer members for securely holding said work piece in true alignment with its bore.

References Cited in the file of this patent
UNITED STATES PATENTS

| | | |
|---|---|---|
| 1,216,244 | McDowell | Feb. 13, 1917 |
| 2,089,410 | Olson | Aug. 10, 1937 |
| 2,576,497 | Austin et al. | Nov. 27, 1951 |